US012691762B1

(12) United States Patent
Kobayashi

(10) Patent No.: US 12,691,762 B1
(45) Date of Patent: Jul. 28, 2026

(54) INVERTER DEVICE FOR ELECTRIC VEHICLE

(71) Applicant: SUBARU CORPORATION, Tokyo (JP)

(72) Inventor: Nobuaki Kobayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 270 days.

(21) Appl. No.: 18/723,776

(22) PCT Filed: Mar. 16, 2023

(86) PCT No.: PCT/JP2023/010394
§ 371 (c)(1),
(2) Date: Jun. 24, 2024

(87) PCT Pub. No.: WO2024/189913
PCT Pub. Date: Sep. 19, 2024

(51) Int. Cl.
*B60L 3/00* (2019.01)
*B60L 50/51* (2019.01)

(52) U.S. Cl.
CPC .............. *B60L 3/003* (2013.01); *B60L 50/51* (2019.02); *B60L 2210/40* (2013.01); *B60L 2240/525* (2013.01); *B60L 2260/22* (2013.01); *B60L 2260/46* (2013.01)

(58) Field of Classification Search
CPC .. B60L 3/00; B60L 3/003; B60L 50/51; B60L 2210/40; B60L 2240/525; B60L 2260/22; B60L 2260/46
See application file for complete search history.

(56) References Cited

FOREIGN PATENT DOCUMENTS

JP          2021-125996 A          8/2021

OTHER PUBLICATIONS

International Search Report received in PCT Application No. PCT/JP2023/010394, dated Jun. 6, 2023.

*Primary Examiner* — Robert L Deberadinis
(74) *Attorney, Agent, or Firm* — Rimon P.C.

(57) ABSTRACT

An inverter device for an electric vehicle is configured to be mounted in the electric vehicle including an electric motor configured to generate power for traveling and drive the electric motor. The inverter device includes a multilevel inverter circuit including switching elements, a controller configured to control the switching elements, and temperature sensors configured to respectively detect temperatures of the switching elements. The multilevel inverter circuit includes combinations for outputting phase currents in a same phase and in a same direction as combinations to drive the switching elements. The controller is configured to, when the electric motor is in a locked state in which torque is output from the electric motor and the electric motor is non-rotatable, switch between the combinations of the switching elements to be driven, based on outputs of the temperature sensors.

7 Claims, 9 Drawing Sheets

M1

| CHARACTERISTICS MAP | | | | |
|---|---|---|---|---|
| SWITCHING ELEMENT Q1 | | SWITCHING ELEMENT Q2 | | • • • | SWITCHING ELEMENT Q12 | |
| HEAT GENERATION CHARACTERISTICS | | HEAT GENERATION CHARACTERISTICS | | | HEAT GENERATION CHARACTERISTICS | |
| CONDITION ITEM 1 | PARAMETER | CONDITION ITEM 1 | PARAMETER | | CONDITION ITEM 1 | PARAMETER |
| CONDITION ITEM 2 | PARAMETER | CONDITION ITEM 2 | PARAMETER | • • • | CONDITION ITEM 2 | PARAMETER |
| CONDITION ITEM 3 | PARAMETER | CONDITION ITEM 3 | PARAMETER | | CONDITION ITEM 3 | PARAMETER |
| CONDITION ITEM 4 | PARAMETER | CONDITION ITEM 4 | PARAMETER | | CONDITION ITEM 4 | PARAMETER |
| COOLING CAPACITY | | COOLING CAPACITY | | | COOLING CAPACITY | |
| CONDITION ITEM 1 | PARAMETER | CONDITION ITEM 1 | PARAMETER | • • • | CONDITION ITEM 1 | PARAMETER |
| CONDITION ITEM 2 | PARAMETER | CONDITION ITEM 2 | PARAMETER | | CONDITION ITEM 2 | PARAMETER |
| SPECIFICATION DATA | | SPECIFICATION DATA | | | SPECIFICATION DATA | |
| SPECIFICATION 1 | | SPECIFICATION 1 | | • • • | SPECIFICATION 1 | |
| SPECIFICATION 2 | | SPECIFICATION 2 | | | SPECIFICATION 2 | |

FIG. 3

INVERTER DEVICE FOR ELECTRIC VEHICLE

CROSS-REFERENCE TO RELATED APPLICATIONS

This application is the U.S. National Phase under 35 U.S.C. § 371 of International Application No. PCT/JP2023/010394, filed on Mar. 16, 2023.

TECHNICAL FIELD

The disclosure relates to an inverter device for an electric vehicle.

BACKGROUND

Patent Document 1 describes a vehicle including an inverter capable of outputting electric power from high potential wiring, intermediate potential wiring, and low potential wiring. When a motor is locked, the vehicle protects a switching element of the inverter by alternately switching an operation of the inverter to an intermediate potential operation, a high potential operation, and a low potential operation.

CITATION LIST

Patent Literature

Patent Document 1: JP No. 2021-125996 A

SUMMARY

Technical Problem

In some cases, variation in a heat generation amount or a temperature has already occurred between switching elements constituting an inverter at a timing when a motor starts going into a locked state. Characteristics of the switching elements may also be different. Thus, even when the above-described protection method is adopted as-is, it may be difficult to sufficiently protect the switching elements to be driven The disclosure has an object to provide an inverter device for an electric vehicle capable of more sufficiently protecting the switching elements when an electric motor is in a locked state.

Solution to Problem

One aspect of the disclosure is an inverter device for an electric vehicle including an electric motor configured to generate power for traveling. The inverter device is configured to be mounted in the electric vehicle and drive the electric motor. The inverter device includes: a multilevel inverter circuit including switching elements; a controller configured to control the switching elements; and temperature sensors configured to respectively detect temperatures of the switching elements. The multilevel inverter circuit includes combinations for outputting phase currents in a same phase and in a same direction as combinations to drive the switching elements. The controller is configured to, when the electric motor is in a locked state in which torque is output from the electric motor and the electric motor is non-rotatable, switch between the combinations of the switching elements to be driven, based on outputs of the temperature sensors.

Advantageous Effects of Invention

According to the disclosure, a combination of switching elements to be driven is switched based on an output of a temperature sensor when an electric motor is in a locked state, and thus the switching elements can be more sufficiently protected.

BRIEF DESCRIPTION OF THE DRAWINGS

FIG. 3 is a data chart illustrating an example of a characteristics map of switching elements included in a controller.

DETAILED DESCRIPTION

Embodiments of the disclosure will be described in detail below with reference to the drawings.

First Embodiment

Figure 1:
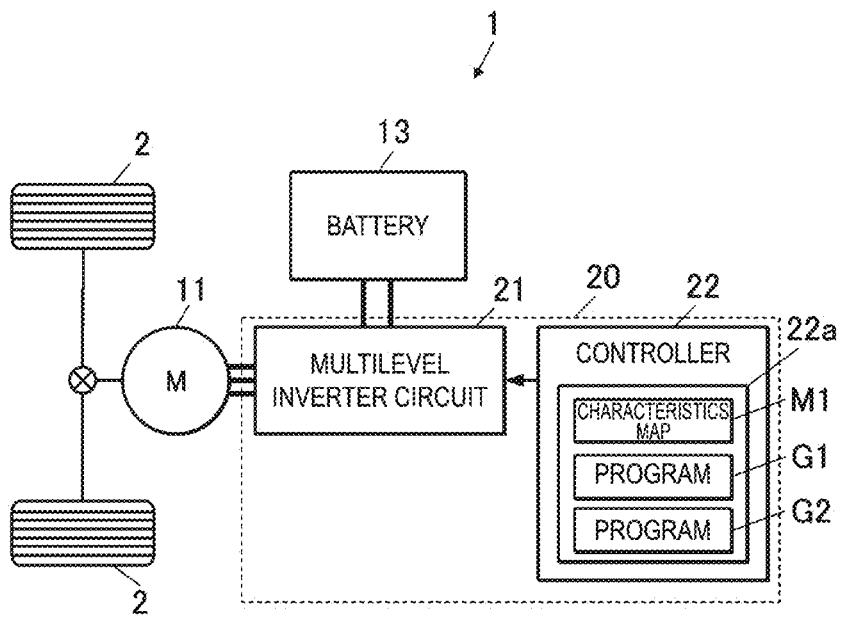
FIG. 1 is a block diagram illustrating an electric vehicle in which an inverter device according to an embodiment of the disclosure is mounted.
Figure 2:
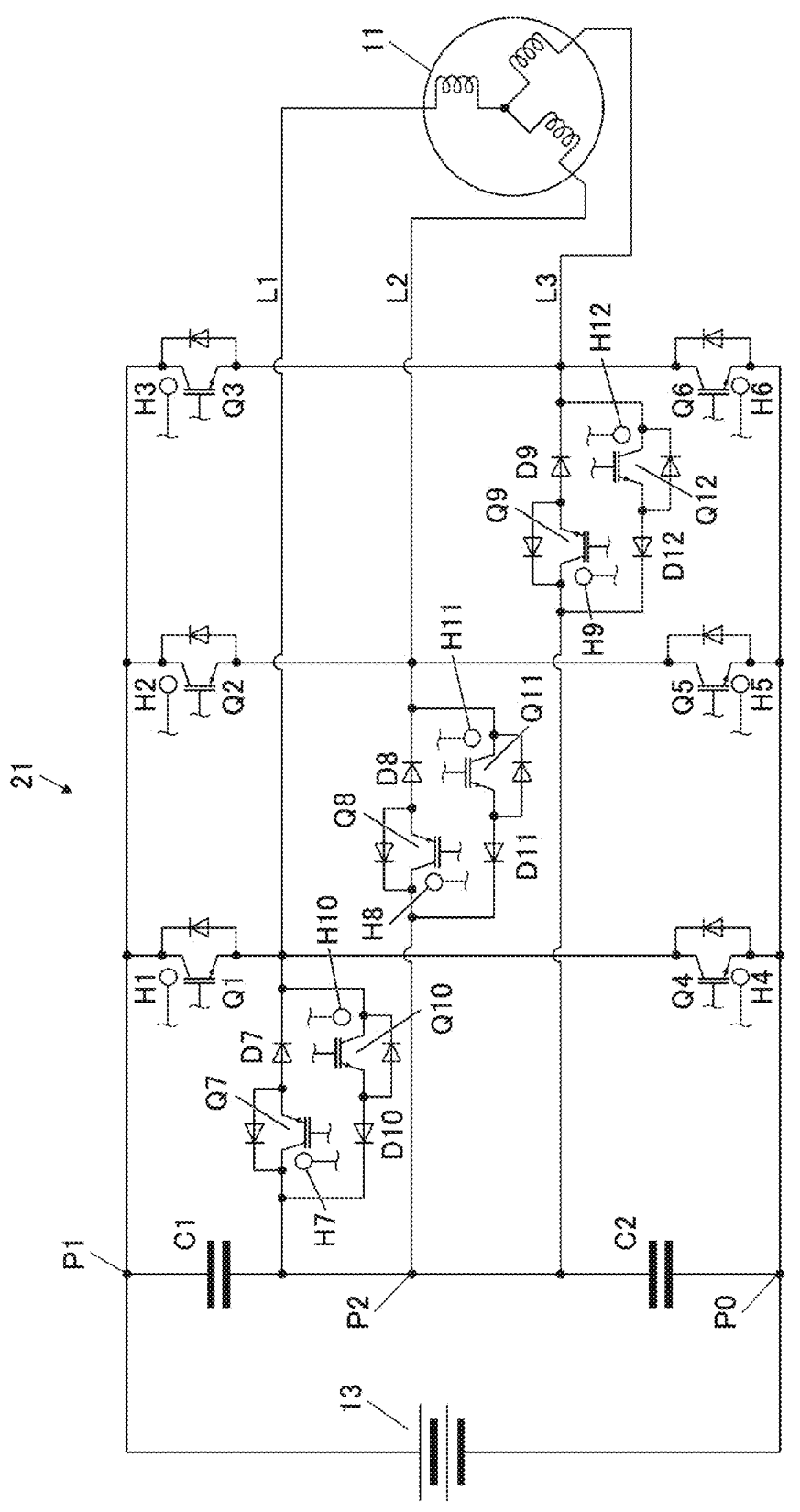
FIG. 2 is a diagram illustrating a multilevel inverter circuit in FIG. 1.

FIG. 1 is a block diagram illustrating an electric vehicle in which an inverter device according to an embodiment of the disclosure is mounted. FIG. 2 is a diagram illustrating a multilevel inverter circuit in FIG. 1.

An electric vehicle 1 illustrated in FIG. 1 includes drive wheels 2, an electric motor 1 that outputs power to the drive w % heels 2 for traveling, a battery 13 that supplies electric power to the electric motor 11, and an inverter device 20 that drives the electric motor 11. The inverter device 20 includes a multilevel inverter circuit 21 that converts electric power between the electric motor 11 and the battery 13, and a controller 22 that controls switching elements Q1 to Q12 of the multilevel inverter circuit 21

The controller 22 performs power running of the electric motor 11 when an acceleration operation is performed by a driving operator (not illustrated), by driving the multilevel inverter circuit 21 at a timing corresponding to a required torque. A positive torque of the electric motor 11 is transmitted to the drive wheels 2 through the power running and the electric vehicle 1 accelerates. The controller 22 performs regenerative running of the electric motor 11 when a deceleration operation is performed by the driving operator (not illustrated), by driving the multilevel inverter circuit 21 at a timing corresponding to a required torque. A negative torque of the electric motor 11 is transmitted to the drive wheels 2 by the regenerative running and the electric vehicle 1 decelerates. The required torque is an output torque required for the electric motor 1 calculated based on the acceleration operation or the deceleration operation.

When the electric vehicle 1 reaches a step and cannot pass the step during traveling, the electric motor 11 and the drive wheels 2 may become non-rotatable while positive torque is output to the electric motor 11 and the drive wheels 2. Such a state of the electric motor 11 is referred to as a locked state. Non-rotatable in the locked state includes, in addition to a state in which a rotor of the electric motor 11 is substantially stopped, a state in which the rotor alternately rotates in a forward direction and a reverse direction within a range not reaching a rotation of 90°.

The multilevel inverter circuit 21 is, for example, a circuit that outputs three phases, namely, a u-phase, a v-phase, and a w-phase to the three-phase electric motor 11. The multi-level inverter circuit 21 has three potential points, namely, a high-side potential point P1, a low-side potential point P0, and an intermediate potential point P2 of the batter 13. The multilevel inverter circuit 21 can generate a voltage between any two potential points among the above-described potential points as an output of one phase. According to this configuration, the multilevel inverter circuit 21 can switch between magnitudes of the output (for example, an output voltage).

For example, the multilevel inverter circuit 21 includes the high-side potential point P1 and the low-side potential point P0 to which a DC voltage is supplied, and two capacitors C1 and C2 that generate the intermediate potential point P2 from the DC voltage. The multilevel inverter circuit 21 includes three-phase output lines (u-phase line, v-phase line, and w-phase line) L1 to L3 and the switching elements Q1 to Q12 capable of switching between connecting to and disconnecting from the potential points. The switching elements Q1 to 012 include the switching elements Q1 to Q3 provided between the high-side potential point P1 and the three-phase output lines L1 to L3, respectively, and the switching elements Q4 to Q6 provided between the low-side potential point P0 and the three-phase output lines L1 to L3, respectively. The switching elements Q1 to Q12 include the switching elements Q7 to Q9 provided between the intermediate potential point P2 and the three-phase output lines L1 to L3, respectively, and each cause a current to flow in the forward direction; and the switching elements Q10 to Q12 provided between the intermediate potential point P2 and the three-phase output lines L1 to L3, respectively, and each causing a current to flow in the reverse direction. The switching elements Q7 to Q9 each causing a current to flow in the forward direction are connected in series with rectifying elements D7 to D9, respectively, each for blocking the current in the reverse direction. The switching elements Q10 to Q12 each causing a current to flow in the reverse direction are connected in series with rectifying elements D10 to D12, respectively, each for blocking the current in the forward direction.

The switching elements Q1 to Q12 are not particularly limited, but are semi-conductor switches for the electric power such as an Insulated Gate Bipolar Transistor (IGBT). The switching elements Q1 to Q12 may have different characteristics (that is, different sizes, different specifications, or the like) between the switching elements Q1 to Q6 and the switching elements Q7 to Q12, for example. The switching elements Q1 to Q12 may include an element having a rated temperature of a first temperature (for example, 150° C.) and an element having a rated temperature of a second temperature (for example, 200° C.) ditTerent from the first temperature. For example, when a silicon (Si) semiconductor element is used, the rated temperature is the first temperature, and when a silicon carbide (SiC) semiconductor element is used, the rated temperature is the second temperature. As the switching elements Q1 to Q12, elements made of other semiconductor materials may be used or elements made of other semiconductor materials may be included.

The multilevel inverter circuit 21 is provided with temperature sensors H to H12 that measure temperatures of the switching elements O1 to Q12, respectively. The temperature sensors H1 to H12 are configured to respectively detect the temperatures of the switching elements Q1 to Q12 based on a forward voltage of a diode for temperature detection connected to a wiring of the multilevel inverter circuit 21, for example. However, the temperature sensors H1 to H12 may have any configuration as long as the temperatures of the switching elements Q1 to Q12 can be respectively detected. Detection results of the temperature sensors H1 to H12 are sent to the controller 22.

The multilevel inverter circuit 21 includes combinations capable of outputting a phase current in the same phase and the same direction as a combination for driving the switching elements Q1 to Q12. For example, the combinations capable of outputting a u-phase current in the u-phase and in the forward direction include a combination of the switching elements Q1 and Q5, a combination of the switching elements Q1 and Q11, and a combination of the switching elements Q7 and Q5. Similarly, each of the above-described combinations capable of outputting the u-phase current in the reverse direction, v-phase currents in the forward direction and the reverse direction, and w-phase currents in the forward direction and the reverse direction includes multiple combinations. The "driving" of the switching element means on-driving (that is, driving of closing a switch to enable energization)

In the multilevel inverter circuit 21, one of the switching elements Q1 to Q12 is selected and driven by the controller 22 corresponding to a rotation angle and a rotation speed of the electric motor 11. According to the driving, the power running that generates torque in the electric motor 11 or the regenerative running that generates negative torque in the electric motor 11 is realized. A method of driving the switching elements Q1 to Q12 is not particularly limited, but a Pulse Width Modulation (PWM) method is applied.

FIG. 3 is a data chart illustrating an example of a characteristics map of the switching elements included in the controller. The controller 22 includes a characteristics map M1 in a computer readable medium 22a. The characteristics map M1 stores characteristics data relating to a temperature of each of the switching elements Q1 to Q12. The characteristics data includes types of parameters representing heat generation characteristics, types of parameters representing cooling capacity, and specification data relating to heat The parameter representing heat generation characteristics is a parameter representing a relationship between a specific driving condition and a heat generation amount. The parameter includes, for example, a parameter indicating a relationship between a current of the switching element and the heat generation amount, a parameter indicating a relationship between a continuous driving time of the switching element and a correction value of the heat generation amount, and a parameter indicating a relationship between a driving duty of the switching element and the correction value of the heat generation amount. The controller 22 can calculate the heat generation amount of each of the switching elements Q1 to Q12 by using the driving conditions of each of the switching elements Q1 to Q12 and the above-described parameters of the switching elements Q1 to Q12. The parameter representing cooling capacity is a parameter representing a relationship between a specific condition and the cooling capacity. The parameter includes, for example, a parameter representing a relationship between an environmental temperature and the cooling capacity, a parameter representing a relationship between a temperature of another adjacent switching element and the correction value of the cooling capacity, and a parameter representing a relationship between a temperature of its own switching element and the correction value of the cooling capacity. The controller 22 can calculate the cooling capacity of each of the switching elements Q1 to Q12 from the above-described conditions. The specification data relating to heat includes a heat capacity, a rated temperature, and the like.

The controller 22 can calculate the heat generation amount and a cooling amount of each of the switching elements Q1 to Q12 by using the driving condition of the multilevel inverter circuit 21, the environmental temperature, a respective one of the temperatures of the switching elements Q1 to Q12, and the characteristics data of the characteristics map M1 From these, the controller 22 can estimate a temperature gradient and change in a temperature margin of each of the switching elements Q1 to Q12. The driving condition of the multilevel inverter circuit 21 include conditions under which the driving condition of each of the switching elements Q1 to Q12 can be estimated. The conditions include, for example, output electric power, a rotational speed and a rotational angle of the electric motor 11, and a driving pattern of each of the switching elements Q1 to Q12. The "temperature gradient" means a temperature rise amount per unit time. The "temperature margin" means a difference between a rated temperature and a current temperature (temperature margin=rated temperature−current temperature) in each of the switching elements Q1 to Q12.

The characteristics data stored in the characteristics map M1 is not limited to the above example. For example, the characteristics data may be map data or parameters of a calculation formula capable of calculating an estimated value of the temperature gradient of each of the switching elements Q1 to Q12 by inputting a rough driving condition and a rough environmental condition (environmental temperature or the like)

Specifications (sizes, types of semiconductors, and the like) of the switching elements Q1 to Q12 are not constant. The switching elements Q1 to Q12 have different cooling structures (for example, a distance between each element and a cooling fin corresponding to the element, a cooling capacity of each cooling fin, and the like). Thus, characteristics relating to the temperature of the switching elements Q1 to Q12 include variations.

The controller 22 may monitor the driving conditions and the environmental conditions, and the temperatures of the switching elements Q1 to Q12 during normal traveling of the electric vehicle 1, and may perform learning processing of updating the characteristics data of the characteristics map M1 based on a result of the monitoring. According to the learning processing, even when a change occurs in the characteristics relating to the temperature of each of the switching elements Q1 to Q12 due to a secular change of the multilevel inverter circuit 21 and the cooling device thereof, the change can be reflected in the characteristics map M1.

Driving Example of Switching Elements

Figure 4:
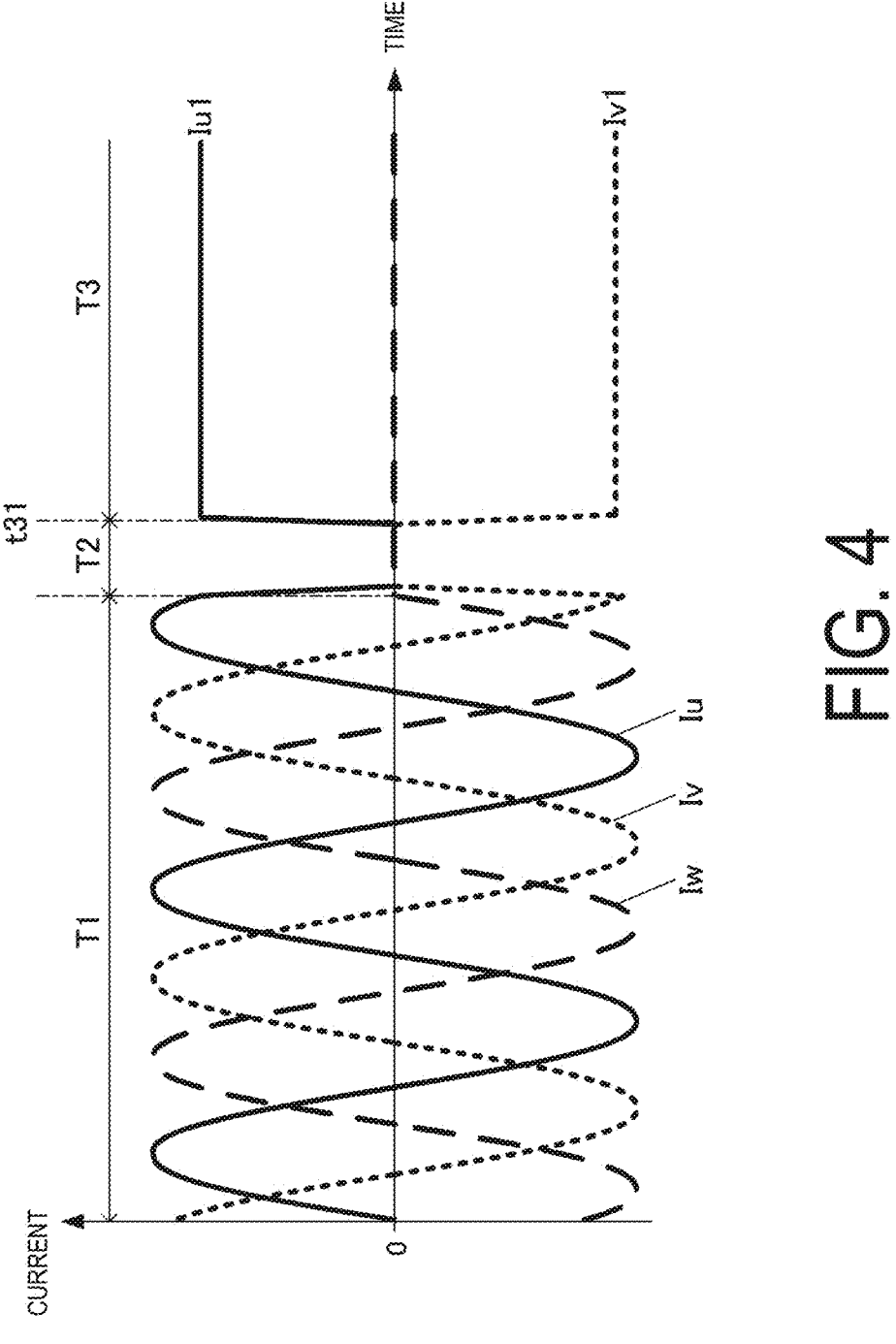
FIG. 4 is a time chart illustrating an output example of the multilevel inverter circuit.
Figure 5:
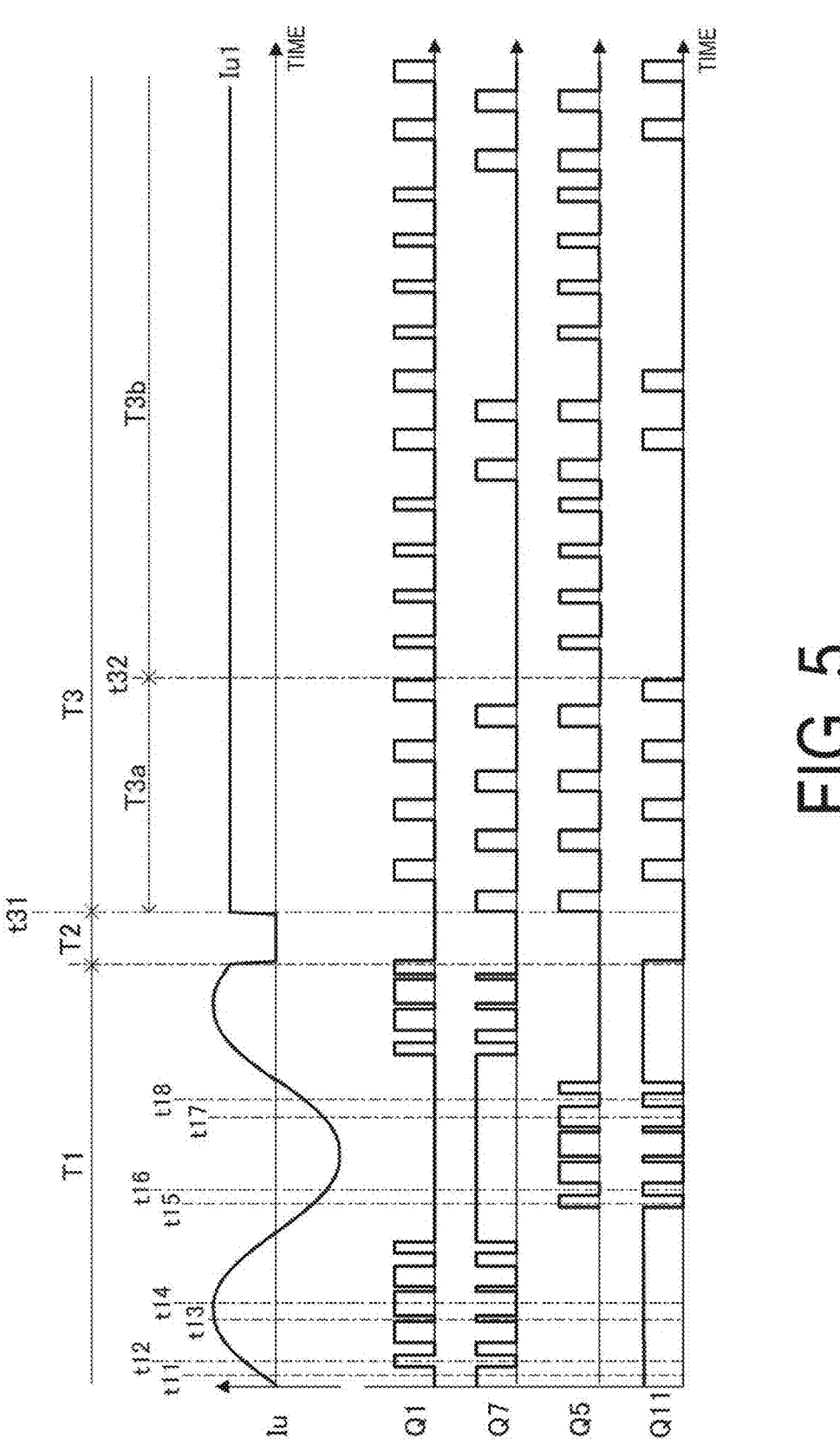
FIG. 5 is a time chart illustrating a driving example of the switching elements in the output example in FIG. 4.
Figure 6:
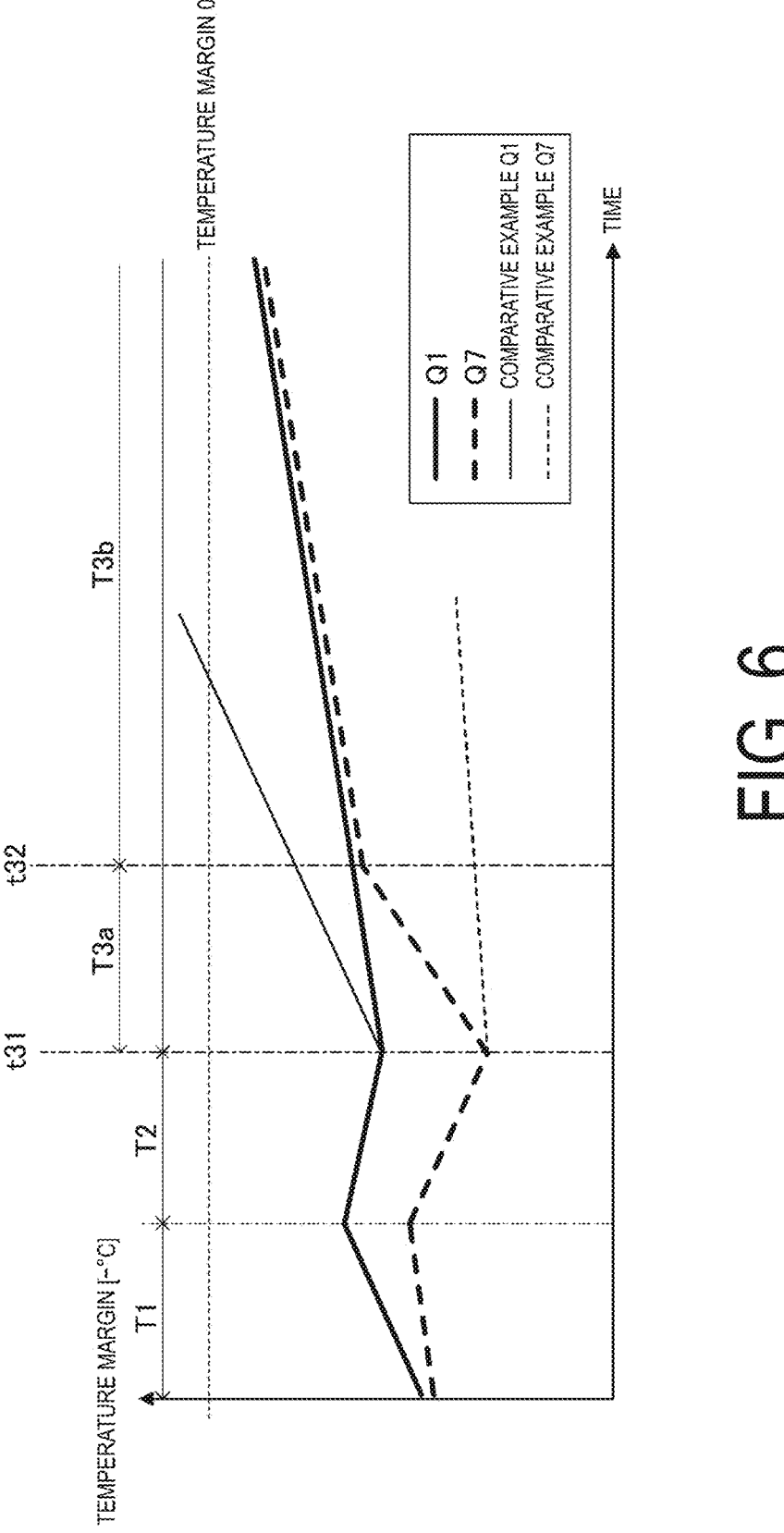
FIG. 6 is a time chart illustrating an example of temperature changes of the switching elements in the driving example in FIG. 5.

FIG. 4 is a time chart illustrating an output example of the multilevel inverter circuit. FIG. 5 is a time chart illustrating a driving example of the switching elements in the output example in FIG. 4. FIG. 6 is a time chart illustrating an example of temperature changes of the switching elements in the driving example in FIG. 5. FIG. 5 illustrates an output of the u-phase and a driving example of each of four switching elements Q1. Q5. Q7, and Q11. In the chart line of the switching element, a high level indicates an ON state and a low level indicates an OFF state. FIG. 6 illustrates changes in the temperature margins of the two switching elements Q5 and Q7 that generate heat through the output of the u-phase.

As illustrated in FIG. 4, in a period T1 during the power running of the electric motor 11, the multilevel inverter circuit 21 outputs three-phase currents corresponding to a rotation angle and a rotation speed of the rotor. In the period T1, focusing on the switching elements Q1, Q5, Q7, and Q11 relating to the u-phase output, the controller 22 performs the following control. That is, as illustrated in the period T1 in FIG. 5, in a positive current outputting period, the controller 22 alternately switches between driving of the switching elements Q7 and Q11 (timings t11, t13, and the like) and driving of the switching elements Q1 and Q11 (timings t12, t14, and the like). In a negative current outputting period, the controller 22 alternately switches between driving of the switching elements Q7 and Q5 (timings t15, t17, and the like) and driving of the switching elements Q7 and Q11 (timings t16, t18, and the like). The controller 22 switches the driving of the switching elements Q1, Q5, Q7, and Q11 with a pulse width of a PWM control.

When the electric motor 11 stops, the output of the multilevel inverter circuit 21 also stops as illustrated in a period T2 in FIG. 4. At a timing t31, when the locked state is achieved as illustrated in a period T3 in FIG. 4, the outputs of the substantially constant three-phase currents from the multilevel inverter circuit 21 are continued corresponding to the rotation angle of the rotor. In the example in FIG. 4, the locked state is achieved at a rotation angle at which a forward current Iu1 flows through a coil of the u-phase, a reverse current Iv1 flows through a coil of the v-phase, and a current of a coil of the w-phase is zero.

When the locked state is achieved at the timing t31, the controller 22 drives the switching elements Q1, Q5, Q7, and Q11 so that output currents (output current of the u-phase Iu1 and the output current of the v-phase Iv1=−Iu1) in the period T3 in FIG. 4 are generated as illustrated in the period T3 in FIG. 5. The switching element Q1 is referred to as a first switching element Q1, and the switching element Q7 is referred to as a second switching element Q7.

The above-described output currents Iu1 and Iv1 can be generated by a first combination (a combination of "Q1 and Q5" and a combination of "Q1 and Q11") in which the first switching element Q1 is driven and the second switching element Q7 is not driven, as a combination of switching elements to be driven. The above-described output currents Iu1 and Iv1 can be generated by a second combination (a combination of "Q7 and Q5") in which the first switching element Q1 is not driven and the second switching element Q7 is driven, as a combination of switching elements to be driven. The combination of the switching elements Q1 and Q5 can continue to cause the output currents Iu1 and Iv1 to flow through pulse driving of the combination alone. The combination of the switching elements Q1 and Q11 and the combination of the switching elements Q7 and Q5 can continue to cause the output currents Iu1 and Iv1 to flow by alternately performing pulse driving of these combinations The controller 22 switches between the first combination and the second combination as the combination of the switching elements to be driven, based on the outputs of the temperature sensors H1 and N7. For example, the controller 22 switches between the first combination and the second combination at an appropriate ratio, based on the temperature margins of the first switching element Q1 and the second switching element Q7.

In some cases, when the locked state is achieved, at the timing t31 that is a starting end of the locked state, a variation in the temperature margins of the switching elements Q1 has occurred due to the driving of the electric motor 11 up to the timing t31. In the case in FIG. 6, at the timing t31 of the starting end of the locked state, the temperature margin of the second switching element Q7 is greater than the temperature margin of the first switching element Q1.

In such a situation where there is a difference in the temperature margin, the controller 22 switches the combination of the switching elements to be driven at a ratio in which a temperature gradient having a larger temperature margin is larger than a temperature gradient having a smaller temperature margin (see a period T3*a*). In the example in FIG. 5, the controller 22 selects the combination such that the driving ratio of the first switching element Q1 having the small temperature margin is the low est. That is, a driving ratio of the combination of the switching elements Q1 and Q5 is set to zero, and a driving ratio of alternately driving the switching elements Q1 and Q11 and driving the switching elements Q7 and Q5 is set to 100%. According to the driving, the first switching element Q1 and the second switching element Q7 are driven at the same ratio. How ever, due to the characteristic that the element size of the second switching element Q7 is small, the temperature gradient of the first switching element Q1 is not as steep as the temperature gradient of the second switching element Q7 (see a period T3*a* in FIG. 6).

The controller 22 does not need to set the driving ratio of the first switching elements Q1 to be the lowest in the above-described temperature margin. The controller 22 may set the driving ratio of the first switching element Q1 to be slightly higher than the driving ratio when the driving ratio is the lowest as long as the driving ratio is such that the temperature gradient of the first switching element Q1 is not as steep as the temperature gradient of the second switching element Q7.

Then, the driving as described above continues in the period T3*a*, and thus at a timing t32 of the end of the period T3*a*, the temperature margins of the first switching element Q1 and the second switching element Q7 are balanced. The "balance of the temperature margins" means that the difference between both temperature margins is less than 5° C.

When the temperature margins are balanced, the controller 22 calculates a driving ratio in which the temperature gradient of the first switching element Q1 and the temperature gradient of the second switching element Q7 are balanced, based on the characteristics map M1. Then, as illustrated in the period T3*b* in FIG. 5, in order to realize the abo % e-described driving ratio, the pulse driving of the switching elements Q1 and Q5 and the alternate driving of the switching elements Q1 and Q11 and the switching elements Q7 and Q5 are performed to generate the output current Iu1. The "temperature gradients are balanced" is a relationship in which the difference in the temperature gradient is within 15%, more preferably within 5%, of the larger temperature gradient. Then, the driving as described above continues in the period T3*b*, and thus as illustrated in FIG. 6, the temperature margin of the first switching element Q1 and the temperature margin of the second switching element Q7 both become smaller while remaining in a balanced state.

Here, control of a Comparative Example will be described. Broken lines in FIG. 6 indicate changes in the temperature margin of the switching element Q7 when the control of the Comparative Example is performed. It is assumed that the ratio of pulse driving of the switching elements Q1 and Q5 from the starting end t31 of the locked state is set to 100% as the control of the Comparative Example. In such a case, the driving ratio of the first switching element Q1 is higher than the driving ratio of the second switching element Q7. Thus, as indicated by the line of the Comparative Example in FIG. 6, the temperature margin of the first switching element Q1 suddenly decreases while the temperature margin of the second switching element Q7 remains large, and the temperature margin of the first switching element Q1 reaches zero at an early stage.

However, according to the control of the present embodiment, as illustrated in FIG. 6, the time until the temperature margins of the first switching element Q1 and the second switching element Q7 reach zero can be made much longer as compared with the control of the Comparative Example. Thus, there is a high possibility that the locked state of the electric motor 11 can be avoided before the temperature margins of the first switching element Q1 and the second switching element Q7 reach zero, and the switching elements Q1 and Q7 can be sufficiently protected.

In many cases, the switching elements Q1 and Q5 connected to the high-side potential point P1 and the low-side potential point P0, respectively, have similar characteristics with respect to temperature. In many cases, the switching elements Q7 and Q11 connected to the intermediate potential point P2 also have similar characteristics with respect to temperature. Thus, by performing the switching control illustrated in FIG. 6, the temperature margins of the switching elements Q5 and Q11 change in the same manner as the temperature margins of the switching elements Q1 and Q7. Thus, the time until the temperature margins of the switching elements Q5 and Q11 reach zero are similarly made longer, and sufficient protection can be achieved for all of the switching elements Q1, Q5, Q7, and Q11 driven in the locked state.

In some cases, the temperature-related characteristics are more varied among the switching elements Q1 to Q12. Furthermore, there may be a case where there are four or more combinations of the switching elements capable of outputting a current in the locked state by being driven. In these cases, the controller 22 may select any two switching elements capable of changing the driving ratio as the first switching element and the second switching element for controlling the driving ratio. When there are pairs of such two switching elements, the pairs of the first switching element and the second switching element may be selected. Then, the controller 22 may calculate at what driving ratio the selected first switching element and second switching element are driven to bring the temperature gradient closer to be balanced, and may drive the switching elements at the calculated driving ratio. According to such control, as in the examples in FIGS. 4 to 6, the time until the temperature margins of the switching elements driven in the locked state become zero is made longer, and thus each switching element can be sufficiently protected.

Alternately, the controller 22 can obtain an output phase having the largest current value among the three-phase outputs corresponding to a rotational position of the rotor in the locked state. When one output phase having the largest current value is determined, it can be estimated that among the switching elements Q1 to Q12, the temperature margin of the switching element through which the current of the output phase flows becomes small the earliest. Thus, in such a case, the controller 22 may select two switching elements each having the temperature margin estimated to become small earlier as the first switching element and the second switching element for controlling the driving ratio. However, in order to generate the required output current of each phase, the controller 22 selects a combination in which the first switching element is driven and the second switching element is not driven, and a combination in which the first switching element is not driven and the second switching element is driven. Also by such control, similar to the above, the time until the temperature margins of the switching elements driven in the locked state become zero is made longer, and thus each switching element can be sufficiently protected.

In the above-described embodiment, after the temperature margins of the first switching element Q1 and the second switching element Q7 are balanced, the controller 22 calculates the driving ratio in which the temperature margins become smaller while remaining balanced, based on the characteristics map M1. However, the controller 22 need not calculate the driving ratio based on the characteristics map M1. That is, the controller 22 may perform control to start driving at a certain driving ratio and, when the temperature margin starts to widen, to change the driving ratio so that both temperature margins change in a direction opposite to a direction to the widening direction. Also according to such control, control can be realized in which the temperature margins become small while remaining balanced.

The driving patterns of the switching elements Q1 to Q12 described with reference to FIG. 5 are merely an example, and other various patterns may be applied as the driving patterns of the switching elements Q1 to Q12 in the normal state and the locked state.

Inverter Control Processing in Locked State

Figure 7:
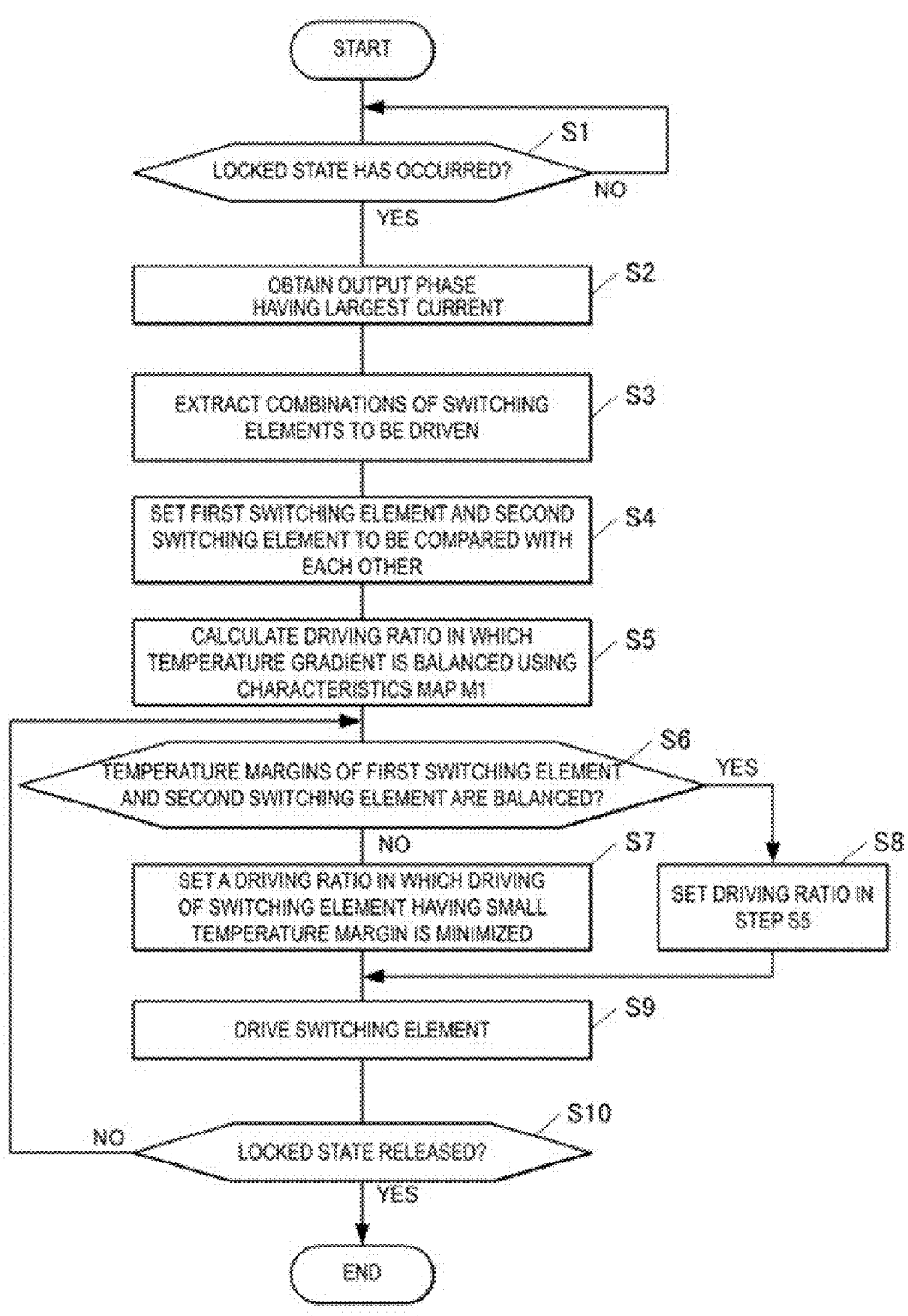
FIG. 7 is a flowchart illustrating an example of inverter control processing in a locked state.

Next, an example of the processing of the controller 22 that realizes the control of the multilevel inverter circuit 21 described above will be described with reference to a flowchart. FIG. 7 is a flowchart illustrating an example of inverter control processing in the locked state.

In the processing, first, the controller 22 determines whether the locked state has occurred, based on the required torque and rotational position data of the rotor of the electric motor 11 (step S1). If NO, then the controller 22 returns the processing to step S1 and repeats determination processing in step S1. On the other hand, if YES, then the controller 22 advances the processing to the next step S2.

When the processing proceeds to step S2, the controller 22 obtains the output phase having the largest current value among the three-phase outputs, based on the rotational position data of the rotor (step S2). Further, the controller 22 extracts combinations of the switching elements Q1 to Q12 capable of generating the current of the output phase determined in step S2 by being pulse-driven or alternately driven (step S3). Further, the controller 22 sets the first switching element and the second switching element to be compared with each other in terms of the temperature margin (step S4).

Next, the controller 22 refers to the characteristics map M1 to calculate at what ratio (that is, driving ratio) the combinations extracted in step S3 are driven so that the temperature gradient of the first switching element and the temperature gradient of the second switching element are balanced (step S5).

Thereafter, the controller 22 determines whether the temperature margins of the two switching elements are balanced (step S6). If NO, then the controller 22 sets the driving ratio of each of the combinations extracted in step S3 so that the driving ratio of the switching element having the smaller temperature margin is minimized (step S7). On the other hand, if the result in step S6 is YES, then the controller 22 sets the driving ratio calculated in step S5 as the driving ratio of each of the combinations extracted in step S3 (step S8).

When the driving ratio is set in steps S7 and S8, the controller 22 drives the switching elements at the set driving ratio (step S9). Then, the controller 22 determines whether the locked state is released (step S10), and if NO, then returns the processing to step S6 and repeats the processing from step S6. On the other hand, if YES, then the controller 22 ends the inverter control processing in the locked state and returns the processing to the inverter control processing in the normal mode.

Figure 8:
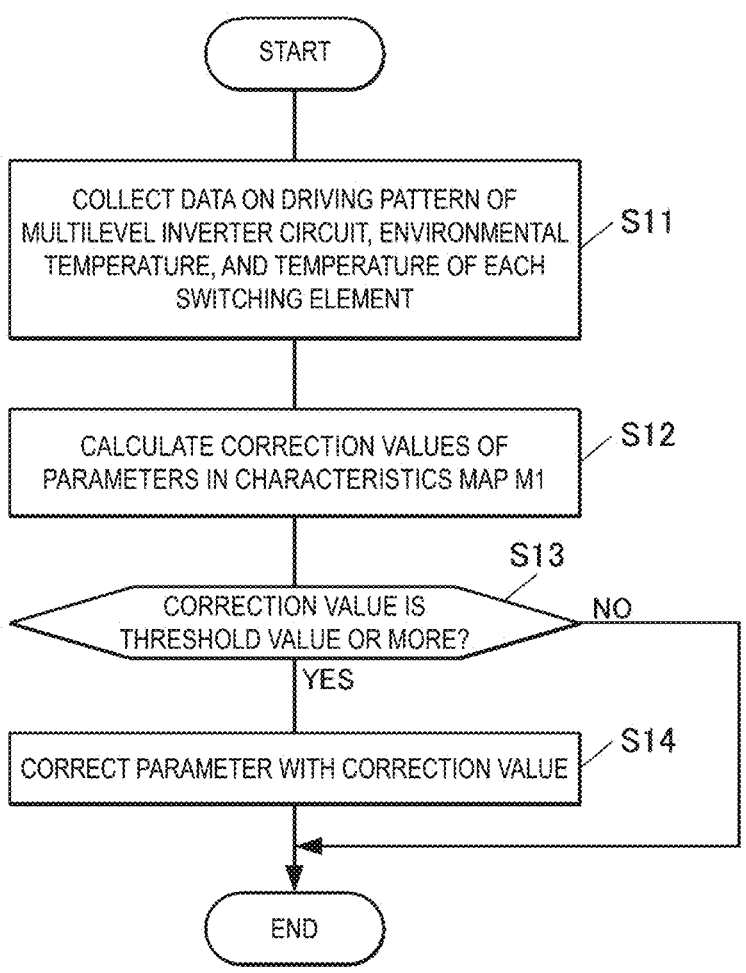
FIG. 8 is a flowchart illustrating an example of characteristics map learning processing.

An example of the control of the multilevel inverter circuit 21 as illustrated in FIGS. 4 to 6 is realized by the inverter control processing in the locked state described above Characteristics Map Learning Processing Next, the learning processing of the characteristics map M1 will be described. FIG. 8 is a flowchart illustrating an example of the characteristics map learning processing executed by the controller 22. The characteristics map learning processing is started at any timing during normal traveling, for example.

When the characteristics map learning processing is started, the controller 22 monitors the driving pattern of the multilevel inverter circuit 21, the environmental temperature of the multilevel inverter circuit 21, and a temperature of each of the switching elements Q1 to Q12 for a predetermined period, and collects this data (step S11). The above-described driving pattern indicates, for example, output currents and in which combination and at which duty ratio the switching elements Q1 to Q12 are driven. Then, the controller 22 calculates a correction value of each of the parameters of the characteristics map M1, based on the data collected in step S11 (step 12).

Next, the controller 22 determines whether the correction value is a threshold value or more (step S13), and if NO, then ends the characteristics map learning processing as it is. On the other hand, if the determination result in step S13 is YES, then each parameter of the characteristics map M1 is corrected based on the correction value (step S14). Then, the controller 22 ends the characteristics map learning processing.

According to such learning processing, even when a change occurs in the characteristics relating to the temperature of the switching elements Q1 to Q12 due to a secular change of the multilevel inverter circuit 21 and the cooling device thereof, the change can be reflected in the characteristics map M1.

A program G1 of the inverter control processing in the locked state and a program G2 of the characteristics map learning processing are stored in a non transitory computer readable medium 22*a* included in the controller 22. The controller 22 may be configured to read the program stored in a portable non transitory computer readable medium and execute the program. The portable non transitory computer readable medium may store the programs G1 and G2.

According to the inverter device 20 of the present embodiment, the multilevel inverter circuit 21 includes the combinations capable of outputting the phase current in the same phase and the same direction as the combination for driving the switching elements Q1 to Q12. In some cases, the switching elements Q1 to Q12 include a switching element in which a large temperature difference has already occurred, for example, when the switching element is in the locked state. In some cases, the switching elements Q1 to Q12 have large differences in heat generation characteristics and cooling characteristics. Thus, in some cases, when the switching elements to be driven are only uniformly driven, the temperature margin of any one of the switching elements becomes zero first. However, according to the inverter device 20 of the present embodiment, when the electric motor 11 is in the locked state, the controller 22 switches the combination of the switching elements Q1 to Q12 to be driven among the combinations, based on the outputs of the temperature sensors H1 to H12. Thus, even when there is a difference in the temperature margin and a difference in the heat generation characteristics and cooling characteristics in the locked state, the combination of the switching elements Q1 to Q12 to be driven can be switched so that the temperature margins of the switching elements to be driven approach the balanced state. Thus, the time until the temperature margins of the switching elements driven in the locked state become zero is made longer, and thus the switching elements can be sufficiently protected.

According to the inverter device 20 of the present embodiment, there are combinations capable of outputting the phase currents in the same phase and the same direction, as the combinations of the switching elements to be driven. The combinations include the first combination in which the first switching element (for example, the switching element Q1) is driven and the second switching element (for example, the switching element Q7) is not driven. Further, the combinations include the second combination in which the first switching element (for example, the switching element Q1) is not driven and the second switching element (for example, the switching element Q7) is driven. In the locked state, the controller 22 switches between the first combination and the second combination at a ratio in which a temperature gradient of one of the first switching element and the second switching element having a larger temperature margin is larger than a temperature gradient of one having a smaller temperature margin. According to such control, the time until the temperature margins of the first switching element and the second switching element become zero is made longer, and thus these switching elements can be sufficiently protected.

According to the inverter device 20 of the present embodiment, in the locked state, when the temperature margin of the first switching element (for example, the switching element Q1) and the temperature margin of the second switching element (for example, the switching element Q7) are balanced, the control is performed as follows. That is, in the above-described case, the controller 22 switches between the first combination and the second combination at a driving ratio in which the temperature gradient of the first switching element and the temperature gradient of the second switching element are balanced. According to such control, the switching elements that generate heat are dispersed at an appropriate ratio, and thus the time until the temperature margins of the switching elements driven in the locked state become zero can be made longer. Thus, the switching elements to be driven can be sufficiently protected.

Further, according to the inverter device 20 of the present embodiment, the controller 22 includes the characteristics map M1, calculates the driving ratio by using the characteristics data of the characteristics map M1, and controls the multilevel inverter circuit 21. Thus, the controller 22 can control the temperature gradients of the switching elements to be driven with high efficiency. Thus, the time until the temperature margins of the switching elements driven in the locked state become zero can be made longer, and thus the switching elements to be driven can be sufficiently protected.

Further, the controller 22 performs the learning processing of updating the characteristics data of the characteristics map M1 when the controller 22 drives the multilevel inverter circuit 21 in a period other than the locked state, based on the outputs of the temperature sensors H1 to H12. According to the processing, even when a secular change occurs in the heat generation characteristics of the switching elements Q1 to Q12 and the cooling capacity of the multilevel inverter circuit 21, the change can be reflected in the characteristics map M1. Thus, the calculation of the driving ratio by using the characteristics data of the characteristics map M1 can be performed more accurately.

Figure 9:
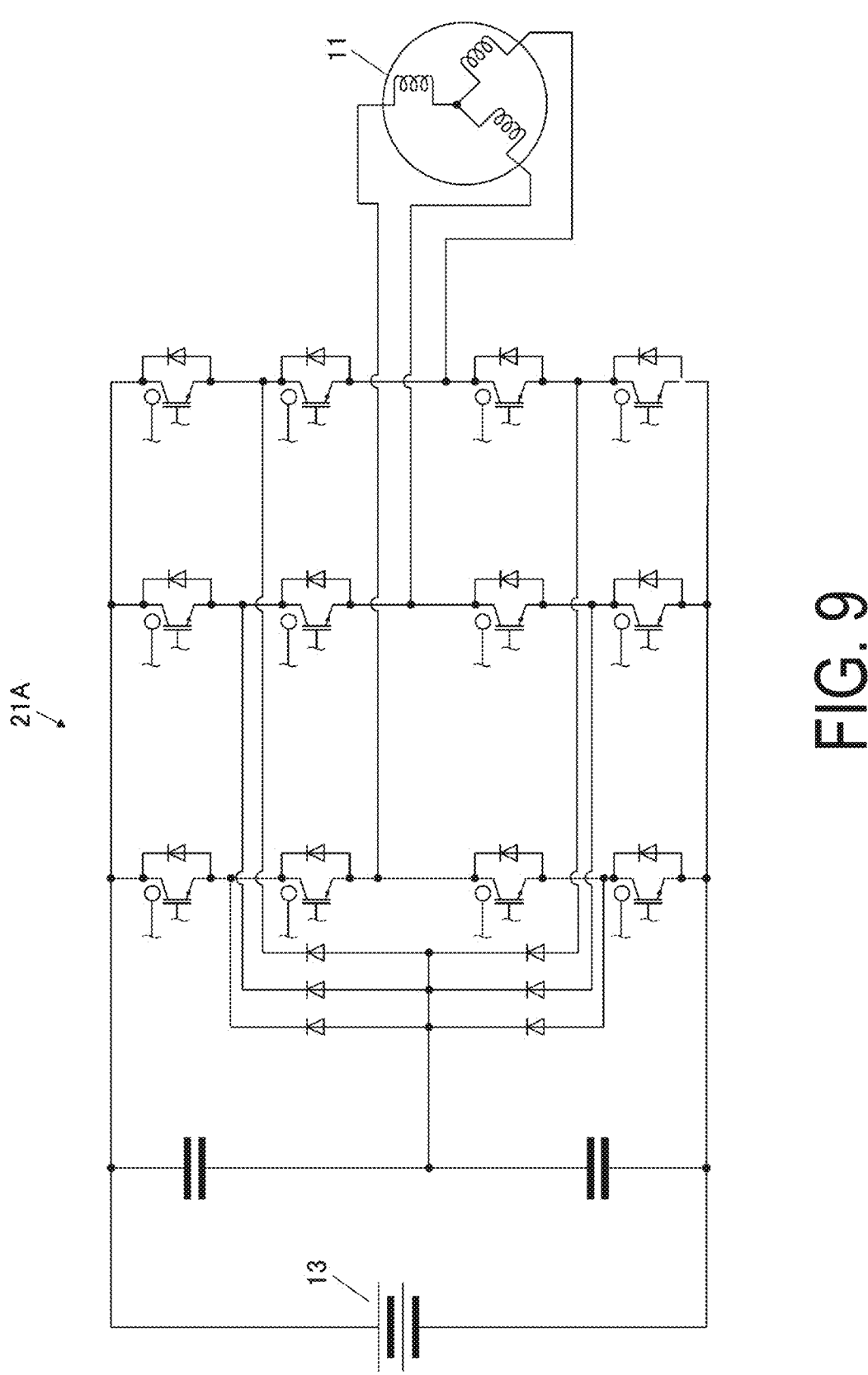
FIG. 9 is a diagram illustrating a multilevel inverter circuit of another embodiment.

The embodiment of the disclosure has been described above. However, the disclosure is not limited to the above embodiment. For example, in the above-described embodiment, an example configuration of the multilevel inverter circuit 21 is illustrated in FIG. 2. However, the multilevel inverter circuit can be changed to various circuit configurations such that a multilevel inverter circuit 21A having another circuit configuration illustrated in FIG. 9 can be applied. In the above-described embodiment, the example in which the electric vehicle 1 is an electric vehicle (EV) has been described. However, the inverter device 20 of the present embodiment may be mounted in an electric vehicle such as a hybrid electric vehicle (HEV) or a plug-in hybrid electric vehicle (PHEV). In addition, details described in the embodiments can be appropriately changed without departing from the gist of the disclosure.

INDUSTRIAL APPLICABILITY

The disclosure is applicable to an inverter de % ice for an electric vehicle.

REFERENCE SIGNS LIST

1 Electric vehicle
2 Drive wheel
11 Electric motor
13 Battery
20 Inverter device
21 Multilevel inverter circuit
C1, C2 Capacitor
D7 to D12 Rectifying element
L1 to L3 Output line
P1 High-side potential point
P2 Intermediate potential point
P0 Low-side potential point
Q1 to Q12 Switching element
H11 to H12 Temperature sensor
22 Controller
22a Computer readable medium
M1 Characteristics map
G1, G2 Program

The invention claimed is:

1. An inverter device for an electric vehicle, the electric vehicle comprising an electric motor configured to generate power for traveling, the inverter device being configured to be mounted in the electric vehicle and drive the electric motor, the inverter device comprising:

a multilevel inverter circuit comprising switching elements;

a controller configured to control the switching elements; and temperature sensors configured to respectively detect temperatures of the switching elements, wherein the multilevel inverter circuit comprises combinations for outputting phase currents in a same phase and in a same direction as combinations to drive the switching elements, and the controller is configured to, when the electric motor is in a locked state in which torque is output from the electric motor and the electric motor is non-rotatable, switch between the combinations of the switching elements to be driven, based on outputs of the temperature sensors.

2. The inverter device for the electric vehicle according to claim 1, wherein the switching elements comprise a first switching element and a second switching element, the combinations comprise a first combination in which the first switching element is driven and the second switching element is not driven, and a second combination in which the first switching element is not driven and the second switching element is driven, and the controller is configured to, in the locked state, switch between the first combination and the second combination at a ratio in which a temperature gradient of one of the first switching element and the second switching element having a larger temperature margin is larger than a temperature gradient of one of the first switching element and the second switching element having a smaller temperature margin.

3. The inverter device for the electric vehicle according to claim 1, wherein the switching elements comprise a first switching element and a second switching element, the combinations comprise a first combination in which the first switching element is driven and the second switching element is not driven, and a second combination in which the first switching element is not driven and the second switching element is driven, and the controller is configured to, in the locked state, switch, when a temperature margin of the first switching element and a temperature margin of the second switching element are balanced, between the first combination and the second combination at a ratio in which the temperature gradient of the first switching element and the temperature gradient of the second switching element are balanced.

4. The inverter device for the electric vehicle according to claim 3, wherein the controller:

comprises characteristics data representing the temperature gradient of the first switching element when the first switching element is driven in the first combination and the temperature gradient of the second switching element when the second switching element is driven in the second combination; and is configured to control the multilevel inverter circuit in the locked state by using the characteristics data.

5. The inverter device for the electric vehicle according to claim 4, wherein the controller is configured to, when the controller drives the multilevel inverter circuit in a period other than the locked state, perform learning processing of updating the characteristics data based on the outputs of the temperature sensors.

6. The inverter device for the electric vehicle according to claim 2, wherein the controller:

comprises characteristics data representing a temperature gradient of the first switching element when the first switching element is driven in the first combination and a temperature gradient of the second switching element when the second switching element is driven in the second combination; and is configured to control the multilevel inverter circuit in the locked state by using the characteristics data.

7. The inverter device for the electric vehicle according to claim 6, wherein the controller is configured to, when the controller drives the multilevel inverter circuit in a period other than the locked state, perform learning processing of updating the characteristics data based on the outputs of the temperature sensors.

* * * * *